United States Patent Office 3,475,812
Patented Nov. 4, 1969

3,475,812
METHOD OF PRODUCING METAL LAMINATE COMPOSITES
George E. Kennedy, Churchill Borough, and Samuel J. Manganello, Penn Hills Township, Allegheny County, Pa., assignors to United States Steel Corporation, a corporation of Delaware
No Drawing. Filed Sept. 16, 1966, Ser. No. 579,829
Int. Cl. B23k 31/02
U.S. Cl. 29—472.3        8 Claims

ABSTRACT OF THE DISCLOSURE

A method of making a composite of steel laminates wherein the bonding surfaces of the laminates are cleaned, assembled in a sandwich-like assembly, and the laminate interfaces evacuated to a pressure of less than 150 microns. The assembly is then hot rolled at a temperature sufficient to cause metallurgical bonding and then strengthening the bond by heating the laminate to a temperature of from 2000 to 2400° F. for a period of at least 45 minutes.

---

This invention relates to a method of producing metal laminate composites. More particularly, the invention relates to a method of making bonded metal composites of steel laminates. Still more particularly, the invention concerns a method of producing steel composites by a roll-bonding process wherein two or more layers are joined by strong metallurgical bonds.

Many methods of producing composite laminates of metal have been known which involve both mechanical and metallurgical bonding of the laminate materials. A typical requirement of such laminating processes is to condition the mating surfaces of the laminates to remove all foreign materials such as scale. Surface conditioning may be accomplished by grinding and/or chemical milling in such a manner that the mating surfaces are cleaned of dirt, chips and organic materials such as oils or greases. The latter are often removed satisfactorily by vapor degreasing and/or by manual cleaning with solvents. The cleaned composite components are then mechanically joined in a manner which would yield the desired product.

Generally, prior to roll-bonding, the components are assembled into a sandwich-like pack. Various methods may be employed to prepare the composite components for joining. In every case, however, the laminates are arranged so that the interface area of the mating surfaces may be evacuated prior to hot working to enhance bonding. One convenient technique involves peripheral welding of the sandwich-like pack. An evacuation tube is provided at each interface. The tube is desirably long enough so that it can be readily attached to a vacuum hose and later sealed tight upon completion of evacuation.

Peripheral welding of the sandwich pack may be accomplished by any convenient method such as by interrupted-arc metal-inert-gas (MIG) technique, using low carbon steel filler metals. Other welding techniques which may be employed are covered-electrode and submerged-arc welding. If high carbon base steels are joined, pre-heat and post-heat treatments may be required to avoid cracking with certain types of electrodes. However, many high carbon steels can be successfully joined without or with only minimal local pre-heat or post-heat by the use of austenitic stainless steel electrodes. The evacuation tubes are also welded in place onto the interface when sealing the periphery.

When a sandwich pack has been assembled and completely sealed, the vacuum hose is attached to an evacuation tube and the evacuation performed. Following evacuation and sealing of the evacuation tube (or tubes), the assemblies are normally hot rolled to plates (to bond the laminates).

While composite products produced by conventional methods as described above are satisfactory for many purposes, we have discovered that products of improved bond strength can be made. According to our invention, there is provided a method of producing high strength bonded laminates of steel which comprises an improvement in the aforementioned conventional process. In practicing our invention, the assembled packs are evacuated to a vacuum pressure usually of less than about 150 microns, preferably less than 50 mcirons, hot rolled at a temperature sufficient to cause metallurgical bonding and then diffusion bonded by heating the roll-bonded composite at a temperature in the range 2000 to 2400° F. for at least about 45 minutes to increase the strength of the metallurgical bond between the laminates. After diffusion bonding, the composite is cooled for handling. The high temperature diffusion bonding may, alternatively, be accomplished either after all rolling is completed or as an intermediate step prior to final rolling.

The importance of the diffusion bonding step following roll-bonding is demonstrated by the following examples of the conventional process and practice according to the invention. A series of composites of the steel composition described in Table I were assembled into sandwich packs after cleaning the mating surfaces by grinding to expose clean silvery metal. Ten packs having two steel plate laminates and two packs with four steel laminates were prepared and assembled. All the assemblies were peripherally welded and the specific welding and evacuation technique employed in each case are given in Table I. Following assembly and evacuation, the packs were heated to the indicated starting rolling temperature and hot rolled. After hot rolling to the indicated final thickness, some of the composites were subjected to a diffusion bonding procedure also as shown in Table I.

Ultrasonic testing, a procedure which is normally used to indicate bond strength, has been found to be not sufficiently sensitive for some applications. In such cases, ballistic testing, probably the most severe test for determining the bond strength of composites, is employed. In many cases where samples qualified well in ultrasonic testing, they failed to qualify in the ballistic tests. Thus, we have found that although all twelve of the composites summarized in Table I complied with the aforementioned ultrasonic test requirements, the three roll-bonded composites which were not given a diffusion bonding treatment delaminated at the bond line during ballistic testing, thus demonstrating the criticality and importance of the final diffusion bond step after hot rolling. The bond quality determined by the ballistic tests is also given in Table I. In general, the samples that were not final diffusion bonded exhibited large amounts of nonmetallic material at the bond line, whereas samples that were final diffusion bonded exhibited more gradual changes of microstructure, i.e. blending of microstructure, at the bond line and only small amounts of discontinuous nonmetallic material. The blended microstructure at the bond line is characteristic of the products produced in accordance with the invention. Actually, various degrees of diffusion bonding occur during contact of clean metal surfaces; however, to obtain the strongest possible bond, that is bond strengths greater than 90% of the lowest strength component, the critical diffusion bonding step must be practiced.

The two-component composites used in the examples described above employed laminates with thickness proportions of the components of approximately 50%–50%. The four-laminate composites used laminates of equal thickness proportions (each laminate approximately 25%

TABLE I

| Example | Plate location | Type steel | Starting thickness, inch | Type grinding of mating surface | Peripheral welding technique | Evacuation technique | Start rolling temp., °F. | Roll- and diffusion-bonding procedure | Nominal final thickness, inch | Quality of bond [1] |
|---|---|---|---|---|---|---|---|---|---|---|
| 1 | Front | 0.59C, Ni-Cr-Mo-V | ½ | Unidirectional | MIG, low-carbon steel filler wire, V-groove, 400° F. preheat and postheat. | Heated to 1,500° F. 10 microns pressure.[2] | 2,100 | Rolled to 0.450 inch, held for 1 hour at 2,100° F., rolled to 0.250 inch, press-flattened. | ¼ | Good. |
| | Rear | 0.40C, Ni-Cr-Mo-V | ½ | do | | | | | | |
| 2 | Front | 0.53C, Cr-Mo | ¾ | do | do | do | 2,100 | Rolled to 0.500 inch, held for 1 hour at 2,100° F., press-flattened. | ½ | Do. |
| | Rear | 0.35C, Cr-Mo | ¾ | do | | | | | | |
| 3 | Front | 17Ni-9Co-5Mo | ½ | do | do | do | 2,250 | Rolled to 0.450 inch, held for 1 hour at 2,100° F., rolled to 0.250 inch, press-flattened. | ¼ | Fair. |
| | Rear | 12Ni-5Cr-3Mo | ½ | do | | | | | | |
| 4 | Front | 1.00C, 52100 | ½ | Circular | Covered electrodes (E7016), 500° F. preheat and postheat, edge weld. | Not evacuated | 2,025 | Rolled to 0.475 inch, no diffusion treatment, press-flattened. | ½ | Poor. |
| | Rear | 0.12C, Ni-Cr-Mo-V | ½ | do | | | | | | |
| 5 | Front | 0.65C, Ni-Cr-Mo | ¾ | do | Covered electrodes (E7016), 500° F. preheat and postheat, fillet weld. | Heated to 1,000° F., 10 microns pressure. | 2,050 | Rolled to 0.645 inch, no diffusion treatment, press-flattened. | ⅜ | Do. |
| | Rear | 0.22C, Ni-Cr-Mo | ¾ | do | | | | | | |
| 6 | Front | 0.65C, Ni-Cr-Mo | ¾ | do | do | Heated to 1,500° F., 10 microns pressure. | 2,050 | do | ⅜ | Do. |
| | Rear | 0.34C, Ni-Cr-Mo-V | ¾ | do | | | | | | |
| 7 | Front | 0.65C, Ni-Cr-Mo | ¾ | do | Covered electrodes (Type 307 stainless), no preheat or postheat, fillet weld. | Outgassed at ambient temperature, 10 microns pressure. | 2,050 | Rolled to 0.675 inch, held for 1½ hours at 2,050° F., press-flattened. | ⅜ | Good. |
| | Rear | 0.34C, Ni-Cr-Mo-V | ¾ | do | | | | | | |
| 8 | Front | 0.61C, Ni-Cr-Mo | ¾ | do | Covered electrodes (E7016), 500° F. preheat and postheat, fillet weld. | Heated to 1,500° F., 10 microns pressure. | 2,050 | Rolled to 0.645 inch, heated to 2,100° F., held for 1 hour, press-flattened. | ⅜ | Do. |
| | Rear | 0.39C, Ni-Cr-Mo | ¾ | do | | | | | | |
| 9 | Front | 0.53C, Cr-Mo | ¼ | Unidirectional | MIG low-carbon steel filler wire, V-groove, 400° F. preheat and postheat. | do | 2,100 | Rolled to 0.300 inch, held for 1 hour at 2,100° F., rolled to 0.250 inch, press-flattened. | ¼ | Do. |
| | Rear | 0.31C, Ni-Cr-Mo | ¼ | do | | | | | | |
| 10 | Front | Ni-Cr-Mo | 5/16 | Circular | Covered electrodes (Type 307 stainless), no preheat or postheat, fillet weld. | Outgassed at ambient temperature, 10 microns pressure. | 2,050 | Rolled to 0.600 inch, held for 1½ hours at 2,050° F., press-flattened. | ½ | Do. |
| | Second | 0.34C, Ni-Cr-Mo-V | 5/16 | do | | | | | | |
| | Third | 0.61C, Ni-Cr-Mo | 5/16 | do | | | | | | |
| | Rear | 0.34C, Ni-Cr-Mo-V | 5/16 | do | | | | | | |
| 11 | Front | 0.65C, Ni-Cr-Mo | 5/16 | do | do | do | 2,050 | do | ½ | Do. |
| | Second | 0.34C, Ni-Cr-Mo-V | 5/16 | do | | | | | | |
| | Third | 0.65C, Ni-Cr-Mo | 5/16 | do | | | | | | |
| | Rear | 0.22C, Ni-Cr-Mo | 5/16 | do | | | | | | |
| 12 | Front | 0.55C, Ni-Cr-Mo | 3 | Mainly unidirectional | Covered electrodes (Type 307 and/or 308 ELC stainless), local preheat and postheat, fillet weld. | Outgassed at ambient temperature, 100 microns pressure. | 2,275 | Rolled to 0.750 inch, held at 2,050° F. for about 1½ hours, press-flattened. | 9/16 | Do. |
| | Rear | 0.34C, Ni-Cr-Mo | 3 | | | | | | | |

[1] As judged from ballistic testing of heat-treated composites.
[2] Vacuum pressure of 5 to 15 microns, actually.

of the thickness). It is apparent, however, that unlimited combinations of thickness proportions could be used with the aforementioned process.

Diffusion bonding in accordance with the invention is accomplished by heating at temperatures between 2000 and 2400° F. for at least about 45 minutes. Composites containing high carbon steels, i.e. steels with greater than about 0.35% carbon, are desirably heated to the low part of the temperature range (i.e. 2000 to 2200° F.) while composites containing low carbon steels (i.e. less than about 0.35% carbon) are desirably heated to the higher portion of the temperature range (i.e. 2200 to 2400° F.). It is also desirable to start the hot rolling in a direction normal to the original major working direction of the base metals if the base metals are rolled plates. This cross rolling minimizes anisotropy and can be readily facilitated by pre-arranging and orientating the evacuation tube parallel to the intended rolling direction of the sandwich pack.

We have found that standard rolling procedures can be followed; however, it is necessary to accomplish a minimum total reduction of about 40% to produce adequate bonding. A total reduction of over 45% is preferred. It is also preferred to practice the diffusion bonding as soon as possible after rolling is completed. Although diffusion bonding may be completed within about 45 minutes, longer periods may be employed if surface decarburization and/or scaling is not a major problem and/or can be controlled or if the composite is relatively thick. Following diffusion bonding, a composite may be slowly cooled from the diffusion bonding temperature if high carbon steels are involved or air cooled if only low carbon steels are involved. Press or roll flattening can be conducted either at this stage, preferably while the composite is still hot, or prior to the diffusion bonding treatment. Final conditioning and heat treating of the composite may be performed as desired.

To minimize the tendency for composites to bow or distort during processing, it is desirable to select base metals that are fairly compatible with one another from the standpoint of the rolling response, heat treatment response, thermal expansion characteristics, etc. Thus, there would be less tendency for bowing in a composite if the steel components transformed during quenching at about the same temperature, e.g. if the steels exhibited similar $B_s$ or $M_s$ temperatures.

It is apparent from the above that various changes and modifications may be made without departing from the invention. For example, an alternative procedure for the complete peripheral welding of the sandwich pack described above is partial peripheral welding and subsequent enclosure (encapsulation) of the pack within an air tight steel box which is evacuated prior to rolling. As can be seen, no intermediate filler metals or other materials are necessary to achieve the bonding in accordance with the invention and the resulting composite has a sound and very strong metallurgical bond between components. Accordingly, the scope of the invention should be limited only by the appended claims whereby what is claimed is:

We claim:

1. In the method of making roll-bonded composites of steel laminates wherein the bonding surfaces of the laminates are cleaned, the laminates assembled into a sandwich-like assembly, the laminate interfaces evacuated and the assembly hot rolled to effect bonding of the laminates, the improvement which comprises evacuating the interfaces to a pressure of less than about 150 microns, hot rolling said assembly at a temperature sufficient to cause metallurgical bonding of the steel laminates and then diffusion bonding the laminates at a temperature in the range of 2000° F. to 2400° F. for at least about 45 minutes to increase the strength of the bond.

2. An improvement according to claim 1 wherein said steel laminates are high carbon steels and said diffusion bonding is performed at 2000 to 2200° F.

3. An improvement according to claim 1 wherein said steel laminates are low carbon steels and diffusion bonding is performed at 2200 to 2400° F.

4. An improvement according to claim 1 wherein said hot rolling to cause metallurgical bonding is to at least a 40% total reduction in thickness.

5. An improvement according to claim 4 wherein said hot rolling is to at least a 45% total reduction.

6. An improvement according to claim 1 wherein said composite is diffusion bonded prior to final rolling.

7. An improvement according to claim 1 wherein said steel of said laminates have about the same transformation temperature on quenching.

8. An improvement according to claim 1 wherein said interfaces are evacuated to a pressure of less than 50 microns.

References Cited
UNITED STATES PATENTS

| | | | |
|---|---|---|---|
| 1,886,615 | 11/1932 | Johnson. | |
| 2,438,759 | 3/1948 | Liebowitz | 29—497 X |
| 2,691,815 | 10/1954 | Boessenkool. | |
| 2,704,883 | 3/1955 | Hamilton | 29—471 |
| 2,718,690 | 9/1955 | Ulam | 29—471 |
| 2,758,368 | 8/1956 | Ulam | 29—471 |
| 2,834,102 | 5/1958 | Pflumm | 29—497 |
| 2,860,409 | 11/1958 | Boessenkool | 29—497 |

JOHN F. CAMPBELL, Primary Examiner

R. B. LAZARUS, Assistant Examiner

U.S. Cl. X.R.

29—487, 494, 497